(No Model.)
J. NASE.
NUT LOCK.
No. 462,016. Patented Oct. 27, 1891.
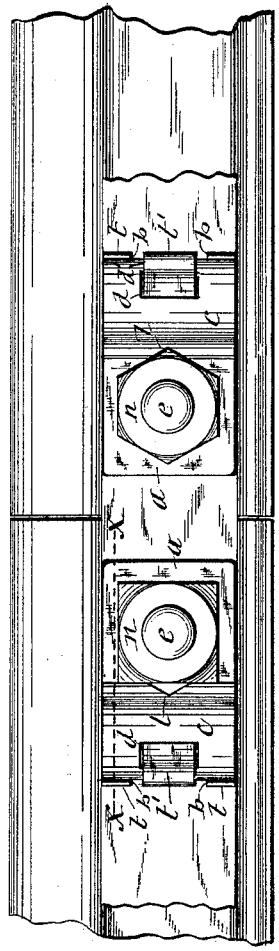
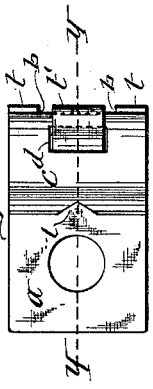
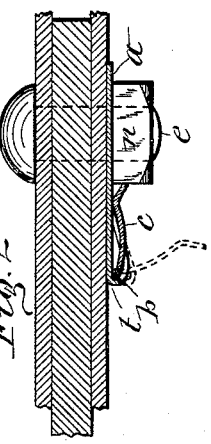
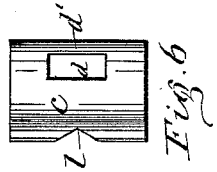
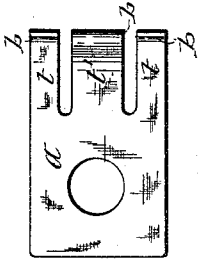
WITNESSES:
C. L. Bendixon
H. M. Seamans
INVENTOR:
John Nase
By Duell, Lasso & Duell
his ATTORNEYS.

UNITED STATES PATENT OFFICE.

JOHN NASE, OF SYRACUSE, NEW YORK, ASSIGNOR TO THE SYRACUSE SPECIALTY MANUFACTURING COMPANY, OF SAME PLACE.

NUT-LOCK.

SPECIFICATION forming part of Letters Patent No. 462,016, dated October 27, 1891.

Application filed January 12, 1891. Serial No. 377,463. (No model.)

*To all whom it may concern:*

Be it known that I, JOHN NASE, of Syracuse, in the county of Onondaga, in the State of New York, have invented new and useful Improvements in Nut-Locks, of which the following, taken in connection with the accompanying drawings, is a full, clear, and exact description.

This invention relates to the class of nut-locks in which a spring-plate is held in place by the bolt passing through said plate and by the nut of said bolt being seated on the plate, and a nut-locking plate is provided with an aperture, through which passes a tongue formed on the spring-plate, whereby said locking-plate is held in its operative position.

The object of this invention is to provide a spring nut-lock which shall be simple and inexpensive in construction and at the same time have its components permanently united, so that they may be shipped in proper condition to be always ready for use; and to that end the invention consists in the improved construction and combination of parts hereinafter described, and specifically set forth in the claim.

In the annexed drawings, Figure 1 is a side view of a section of a railroad-rail splice provided with nut-locks embodying my invention. Fig. 2 is a longitudinal horizontal section on line $x\,x$, Fig. 1, and showing by dotted lines the nut-lock in position for releasing the nut. Fig. 3 is a detached plan view of the nut-lock. Fig. 4 is a longitudinal section on line $y\,y$, Fig. 3; and Figs. 5 and 6 are detached plan views of the two plates which constitute the nut-lock.

Similar letters of reference indicate corresponding parts.

$a$ represents a washer or plate provided with an orifice through which the bolt $e$ passes. To this washer or plate is hinged a plate $c$ in such a manner as to allow the latter plate to be either folded onto the plate $a$ and bear with its free edge on the side or corner of the nut $n$, as shown in Fig. 1 of the drawings, or swing with its free edge away from the plate $a$ to release the nut, as represented by dotted lines in Fig. 2 of the drawings.

The washer or plate $a$ I preferably form of spring-steel and with the arms $t\,t$ and spring-tongue $t'$, which are parallel, side by side, and terminate, respectively, with bearings or shoulders $b\,b$ and $b'$ on their free ends, which bearings are formed by a downward bend on the central tongue $t'$ and upward bends on the two arms $t\,t$.

The plate $c$ I provide with the opening $d$, leaving on the edge of the plate the cross-bar $d'$, which, together with the adjacent end portions of the plate, constitute the hinge-pin.

The plate $c$ is placed upon the top of the washer $a$ and permanently hinged thereto by the spring-tongue $t'$, passing up through the slot $d$ and lying upon the cross-bar $d'$, while the adjacent end portions of the plate $c$ rest upon the arms $t\,t$. The rear edges of the cross-bar $d'$ and aforesaid end portions of the plate $c$ abut against the shoulders $b'$ and $b\,b$, and thus the plate $c$ is prevented from slipping off from the washer $a$. In this united condition the described components of the nut-lock are placed on the market and are therefore always ready for use.

When it is desired to remove the nut or to tighten it, the plate $c$ can be swung with its free edge away from the washer $a$, so as to stand at right angles therefrom, as represented by dotted lines in Fig. 2 of the drawings, and when in this position the pressure of the spring-tongue $t'$ upon the edge of the bar $d'$ retains the plate $c$ in said position.

I preferably provide the free edge of the plate $c$ with a notch $l$, by which it can engage the corner of the nut $n$, as shown in Fig. 1 of the drawings.

Having described my invention, what I claim as new, and desire to secure by Letters Patent, is—

The improved nut-lock consisting of the washer $a$, formed with the supporting-arms $t\,t$, terminating with the upturned shoulders $b\,b$, and spring-tongue $t'$, terminating with the downturned shoulder $b'$, in combination with the locking-plate $c$, formed with the slot $d$ and cross-bar $d'$ and receiving through the said slot the spring-tongue $t'$ and resting with its adjacent end portions on the arms $tt$ and abutting against the shoulders $b'$ and $b\ b$, whereby the said locking-plate is permanently hinged to the washer, as set forth.

In testimony whereof I have hereunto signed my name this 6th day of January, 1891.

JOHN NASE. [L. S.]

Witnesses:
  MARK W. DEWEY,
  C. L. BENDIXON.